US010728333B2

(12) United States Patent
Hegde et al.

(10) Patent No.: US 10,728,333 B2
(45) Date of Patent: Jul. 28, 2020

(54) DYNAMICALLY SWITCHING BETWEEN OBJECT STORAGE TRANSFER PROTOCOLS

(71) Applicant: International Business Machines Corporation, Armonk, NY (US)

(72) Inventors: Harsha Hegde, Buffalo Grove, IL (US); Robert Veitch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 16/052,149

(22) Filed: Aug. 1, 2018

(65) Prior Publication Data

US 2020/0045109 A1 Feb. 6, 2020

(51) Int. Cl.

| | |
|---|---|
| ***H04L 29/08*** | (2006.01) |
| ***H04L 12/24*** | (2006.01) |
| ***H04L 12/26*** | (2006.01) |
| ***H04L 29/06*** | (2006.01) |

(52) U.S. Cl.

CPC .......... *H04L 67/1097* (2013.01); *H04L 41/20* (2013.01); *H04L 43/0829* (2013.01); *H04L 69/18* (2013.01)

(58) Field of Classification Search

CPC .. H04L 41/20; H04L 43/0829; H04L 67/1097

See application file for complete search history.

(56) References Cited

U.S. PATENT DOCUMENTS

| | | | | |
|---|---|---|---|---|
| 7,065,482 | B2 * | 6/2006 | Shorey | H04L 43/00 703/2 |
| 9,369,520 | B2 | 6/2016 | Luecke et al. | |
| 9,560,010 | B1 | 1/2017 | Estes et al. | |
| 10,437,510 | B2 * | 10/2019 | Batra | G06F 3/0653 |
| 10,440,066 | B2 * | 10/2019 | Gonzales | H04L 69/08 |
| 2014/0019587 | A1 * | 1/2014 | Giladi | H04L 29/06476 709/217 |
| 2017/0201422 | A1 | 7/2017 | LaBrie et al. | |
| 2018/0089278 | A1 * | 3/2018 | Bhattacharjee | H04L 43/08 |
| 2018/0285369 | A1 * | 10/2018 | Lazier | H04L 9/0891 |

* cited by examiner

*Primary Examiner* — Ranodhi Serrao

(74) *Attorney, Agent, or Firm* — James Nock; Eric S. Barr; Roberts Calderon Safran & Cole, P.C.

(57) ABSTRACT

In a data storage network, a data storage transfer is initiated over a communications link between a source endpoint and a storage endpoint. The data storage transfer is configured to transmit at least one data object from the source endpoint to the storage endpoint using a first transfer technology protocol of a plurality of transfer technology protocols supported by the storage endpoint. The source endpoint monitors at least one network performance parameter associated with the communication link between the source endpoint and the storage endpoint. During transfer of the at least one data object, the source endpoint automatically switches from the first transfer technology protocol to a second transfer technology protocol based, at least in part, on a result of the monitoring.

14 Claims, 6 Drawing Sheets distributed, or dispersed, storage network (DSN) 10

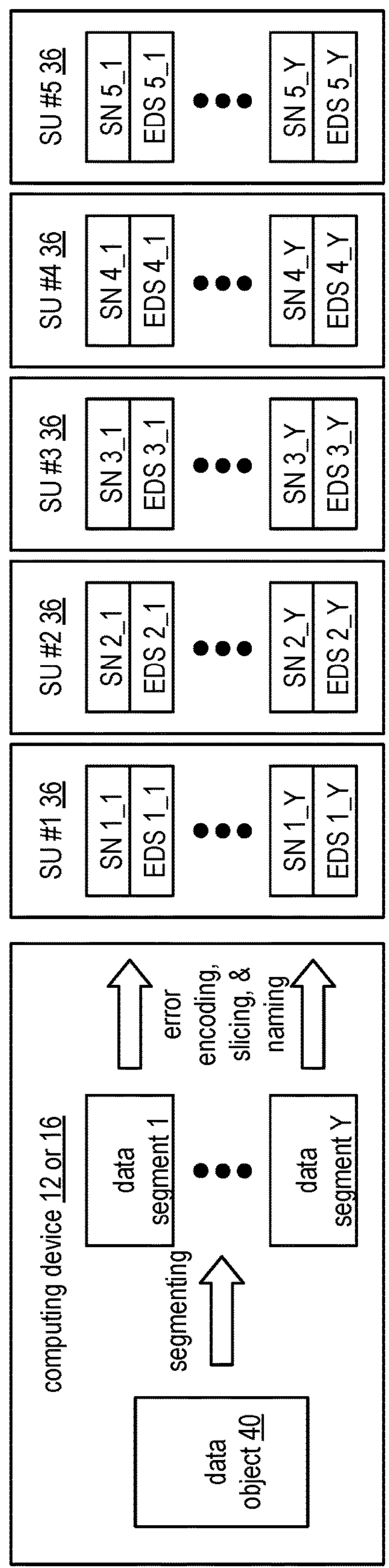
FIG. 4
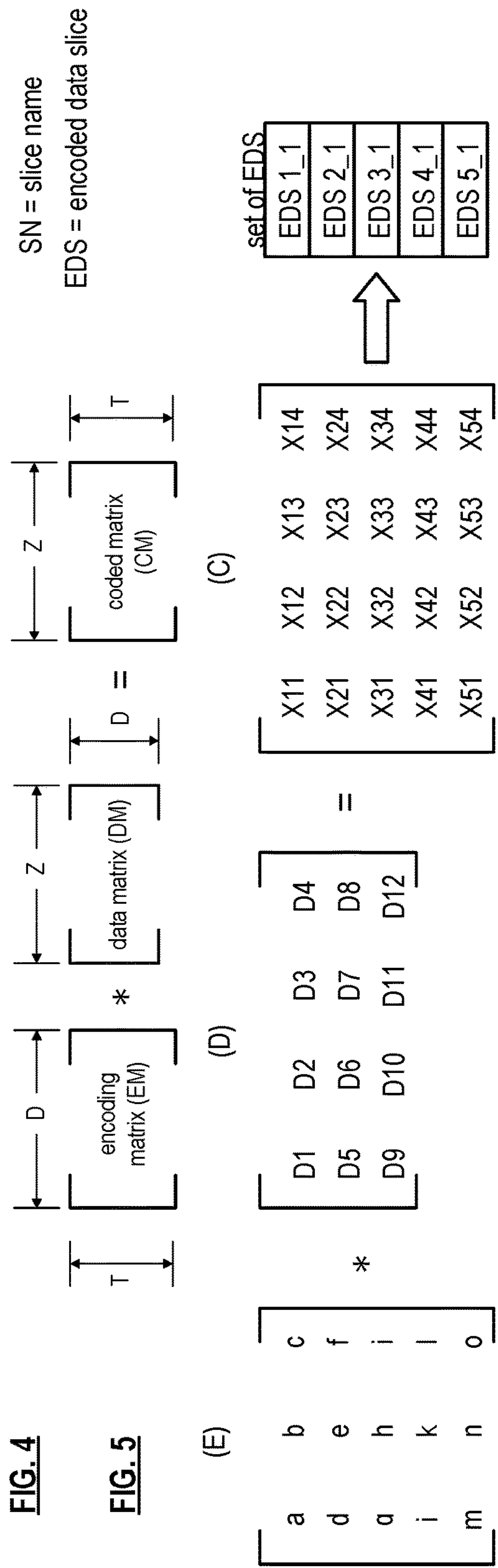
FIG. 5
FIG. 6
| slice name 80 | | | | |
|---|---|---|---|---|
| pillar # | data segment # | vault ID | data object ID | rev. info |
FIG. 7

D
D
decoding matrix ($E^{-1}$)
*
Z
D
coded matrix (CM)
=
Z
D
data matrix (DM)

DYNAMICALLY SWITCHING BETWEEN OBJECT STORAGE TRANSFER PROTOCOLS

BACKGROUND

This invention relates generally to transferring data for storage, and more particularly to dynamically switching storage protocols during transfer of objects for storage.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In an object storage system in the public cloud used for "cloud storage," transfer services, such as Aspera® and FASP® are sometimes used. Services service can be used by a client application using a software development kit (SDK) offered by the object storage vendor. However, the user has to manually decide whether to use the transfer service, or to use some other transfer service. This decision must often made blindly in advance, or after experiencing poor performance during upload or download without knowing the cause of the poor performance.

SUMMARY

According to various embodiments of the present disclosure, a method for use in a data storage network includes using a source endpoint to initiate a data storage transfer over a communications link between a source endpoint and a storage endpoint. The data storage transfer transmits, from the source endpoint to the storage endpoint, a data object, or set of data objects, for storage in the storage endpoint. The initial transfer of data objects can be performed using an initial transfer technology protocol, sometimes referred to herein as a transfer service, or a storage transfer protocol. The storage endpoint supports more than one transfer technology protocol. The source endpoint monitors network performance parameters associated with the communication link between the source endpoint and the storage endpoint, either directly or indirectly with the assistance of another device included in the data storage network. During transfer of at least one data object, the source endpoint automatically switches, based at least in part on a result of the monitoring, from the initial technology protocol to one of the other transfer technology protocols supported by the storage endpoint.

In some embodiments, the switching can be performed between individual objects in a set of objects, so that a first object is transferred using one transfer service, or storage transfer protocol, and a second object in the set of objects is transferred using a different transfer service. In other embodiments, switching to a different protocol can be performed during transfer of a single object, so that a portion of the object is transferred using a first storage transfer protocol, and a second portion of that same object is transferred using a second storage transfer protocol.

Various embodiments enable an end-user to configure various transfer parameters using a software data kit (SDK), including setting thresholds for various performance parameters, such as packet loss or round trip time. Additionally, some embodiments can be implemented as a source endpoint device, or as a non-transitory computer readable medium.

BRIEF DESCRIPTION OF THE DRAWINGS

FIG. 4 is a schematic block diagram of an example of dispersed storage error encoding of data in accordance with the present invention;

FIG. 5 is a schematic block diagram of a generic example of an error encoding function in accordance with the present invention;

FIG. 6 is a schematic block diagram of a specific example of an error encoding function in accordance with the present invention;

FIG. 7 is a schematic block diagram of an example of a slice name of an encoded data slice (EDS) in accordance with the present invention;

DETAILED DESCRIPTION

Figure 1:
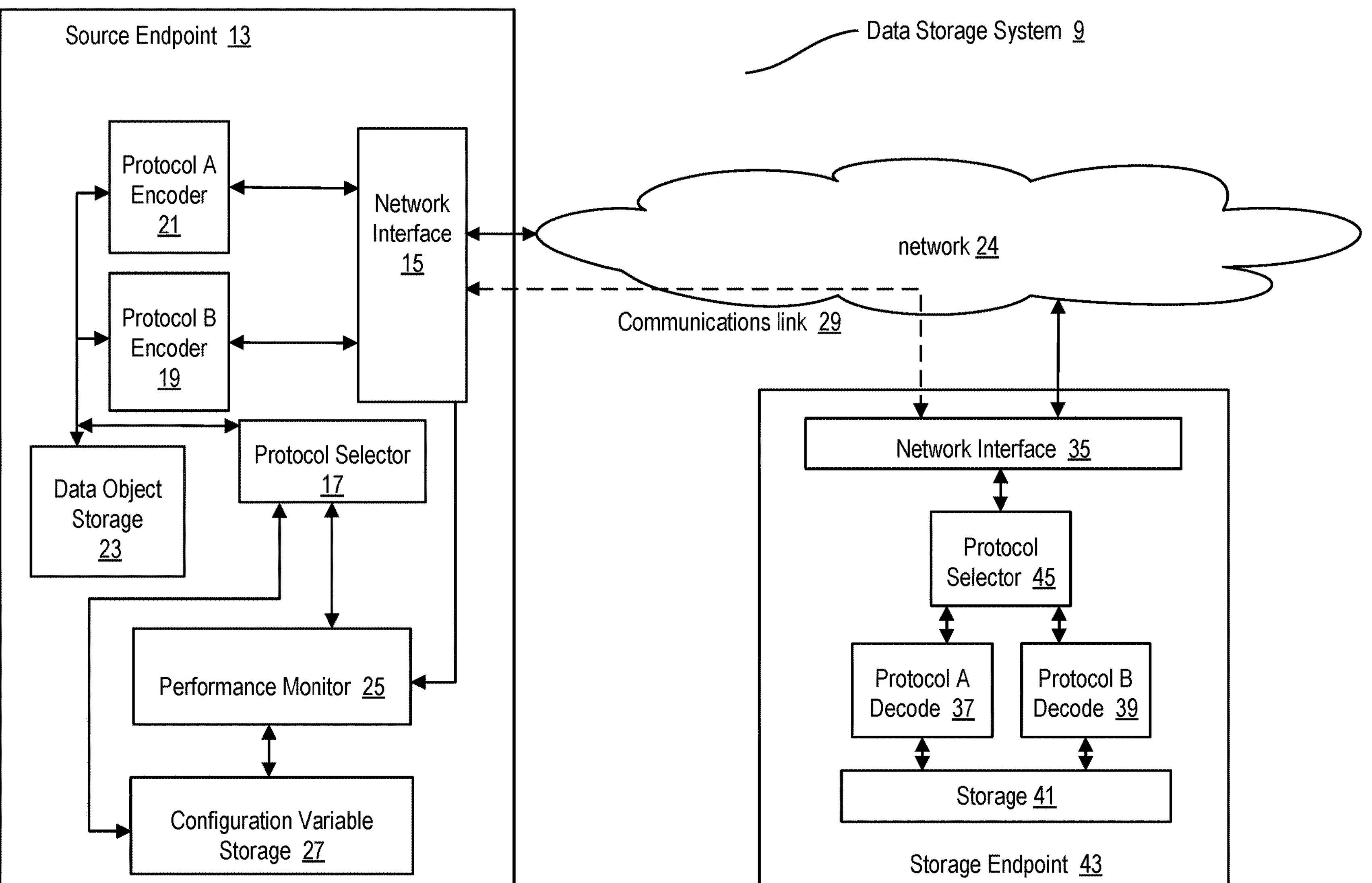
FIG. 1 is a schematic block diagram of an embodiment of a data storage system in accordance with the present invention.

Various embodiments of the present disclosure provide for dynamic switching between transfer services based on real time conditions and performance with an object storage system. As used herein, the term transfer services is used interchangeably with, and should be interpreted to include the terms "transfer technology protocol," "storage transfer protocol," derivatives thereof, unless the context requires otherwise.

Providing an object storage system with the ability to suggest or dynamically switch between transfer technologies based on real conditions and performance of transfers can improve the performance, speed, reliability, and usability of conventional object storage systems. In some embodiments, switching can be implicit or explicit based on configuration of a software development kit (SDK) by the client application and/or a user of the client device.

An SDK or an application using an object storage system having the ability to support multiple transfer services, as described herein, can enable users to configure dynamic switching between transfer services based on one or more conditions, such as real-time network conditions, network limitations, outages, etc. Furthermore, individual functions within the transfer service can be triggered based on any or all of the following conditions monitored by the source endpoint: round trip times for requests and responses; pre-configured IP addresses of end-points for object storage for requests; pre-configured bucket names for read or write requests; pre-configured object names for read or write requests; pre-configured accounts or users for requests; pre-configured file types; and pre-configured file sizes.

Additionally, functions within the transfer service can be triggered based on any or all of the following conditions reported to the source endpoint in, for example, a response from the storage endpoint to the source endpoint: information identifying a transfer type/protocol to use for future storage transfers based on availability of a transfer service or expected outages/disruptions in network or storage service; pre-configured bucket names; pre-configured IP addresses of end points for client applications; pre-configured object names; pre-configured users; pre-configured file types; pre-configured file sizes.

For example, an SDK based application pre-configured with transfer file size of 1 GB or greater, could use an Aspera® FASP® based service for uploads, using multiple sessions for parallel uploads in Aspera®, otherwise regular hypertext transfer protocol (HTTP) based S3 transfer with single part or multi-part upload could be used.

In response to one or more conditions being met, the source endpoint can trigger a switch in the transfer service, or transfer technology protocol, being used by the SDK or application with the object storage, without explicit interaction from the user. In some embodiments, this could facilitate allowing the user or application get optimal performance and help with positive user experience based on real time conditions of the network or storage service.

Referring to FIG. 1, a schematic block diagram of an embodiment of a data storage system 9 will be discussed. Data storage system 9 includes source endpoint 13 and storage endpoint 43, both of which can be implemented using various computing devices discussed herein, coupled together either directly (not illustrated) or via network 24. Source endpoint 13 includes network interface 15, protocol A encoder 21, protocol B encoder 19, protocol selector 17, data object storage 23, performance monitor 25, and configuration variable storage 27. Storage endpoint 43 includes network interface 35, protocol A decoder 37, protocol B decoder 39, and storage 41. Network 24 may include one or more wireless and/or wire lined communication systems; one or more non-public intranet systems and/or public internet systems; and/or one or more local area networks (LAN) and/or wide area networks (WAN).

Source endpoint 13 can initiate a data storage transfer over communications link 29, The data storage transfer transmits data objects obtained, for example, from data object storage 23, from source endpoint 13 to storage endpoint 43 using a transfer technology protocol supported by storage endpoint 43. Protocol selector 17 chooses one of the available storage protocols based, at least in part on an output of performance monitor 25, and in some embodiments based on configuration variables or parameters obtained from configuration variable storage 27.

In an example of operation, protocol selector 17 can select an initial transfer technology protocol for source endpoint to use in initiating a data storage transfer to storage endpoint 43. This initial transfer technology protocol can be selected based on reply from storage endpoint 43 received in response to a storage request generated by source endpoint 13. The initial transfer technology protocol can also be selected based on a default value stored in configuration variable storage 27, a previously used transfer technology protocol, current performance parameters associated with communications link 29, historical performance parameter associated with communications link 29, a user preference, or the like. Some or all performance parameters, whether historical or current, can be transmitted to performance monitor 25 from an external computing device, and provided to protocol selector 17 by performance monitor 25.

In at least one embodiment, the transfer of data objects from source endpoint 13 to storage endpoint 43 continues using the initial transfer technology protocol until performance monitor 25 notifies protocol selector 17 that current performance parameters exceed thresholds established by configuration variables obtained from configuration variable storage 27. For example, if a performance parameter associated with communications link 29 indicates a packet loss, or round trip time that exceeds a threshold for that particular parameter or combination of parameters, performance monitor 25 can provide a notification of that condition to protocol selector 17.

Protocol selector 17 can respond to the notification by choosing a different transfer technology protocol supported by storage endpoint 43, and switching from one protocol encoder to another. For example, if the initial transfer technology protocol is Protocol A, Protocol selector 17 can switch from Protocol A encoder 21 to Protocol B encoder 19. Switching from Protocol A encoder 21 to Protocol B encoder 19 can be performed during transmission of a single object, or during transmission of a set of objects, but between objects within the set of objects. Protocol selector 17 can determine whether a transfer technology protocol is supported by storage endpoint 43 based on information obtained from configuration variable storage 27, based on information obtained in a message from storage endpoint 43, based on preconfigured setting in an SDK or application provided to source endpoint 13 by storage endpoint 43, based on a combination of such information, or the like.

In at least one embodiment, one of the transfer technology protocols supported by storage endpoint 43 is a protocol that provides guaranteed delivery time regardless of file size, transfer distance or network conditions, such as an FASP® protocol. FASP® is a large data transport protocol that achieves reliability in the application layer in an attempt to eliminate or reduce inefficient loss and error handling, along with the resulting erratic transfer rate swings that occur when using a conventional transmission control protocol (TCP). In various embodiments, at least one of the transfer technology protocols is a conventional hypertext transfer protocol (HTTP) based S3 transfer of data. It should be appreciated that in at least one embodiment, other transfer technology protocols can be used in addition to, or in place of, the specifically disclosed protocols. However, in each case both the source endpoint 13 and the storage endpoint 43 support at least two such protocols, which generally include at least one protocol that is more efficient under network conditions involving large packet losses and/or long round trip times, and another protocol that can generally be used under more favorable network conditions.

In at least one embodiment, objects being transmitted for storage include one or more dispersal error encoded data packets to be delivered to storage endpoint 43 for storage in storage 41, but other data objects are also contemplated.

Storage endpoint 43 is, in at least one embodiment, an object-based storage endpoint. Object-based storage refers to a data storage architecture that manages data as objects, as opposed managing data in a file hierarchy, or block storage which manages data as blocks within sectors and tracks. Various embodiments of storage systems and devices described herein are object-based.

Storage endpoint 43 receives objects to be stored from source endpoint 13 using network interface 35 coupled to communications link 29. Protocol Selector 45 determines whether to process the object using Protocol A decoder 37 or Protocol B decoder 39 based on information included in the data itself, based on information included in an storage initiation message received from source endpoint, based on information included in a change message received from source endpoint, or the like. The decoded object is sent to storage 41 for object storage. It should be noted that reference to a "decoded object" in this case does not mean the object is in plaintext, or that all levels of encoding and encryption have been removed. Instead, this particular reference to a "decoded object" refers to recovering the object using one of the transfer technology protocols supported by storage endpoint 43. Thus, in various embodiments, a change, or switch, from one transfer technology protocol to another can occur during transfer of a single object, or between objects included in a set of objects, but the object can still be stored in storage 41 in the same form in which the object existed prior to being encoded by Protocol A encoder 21 or Protocol B encoder 19.

Figure 2:
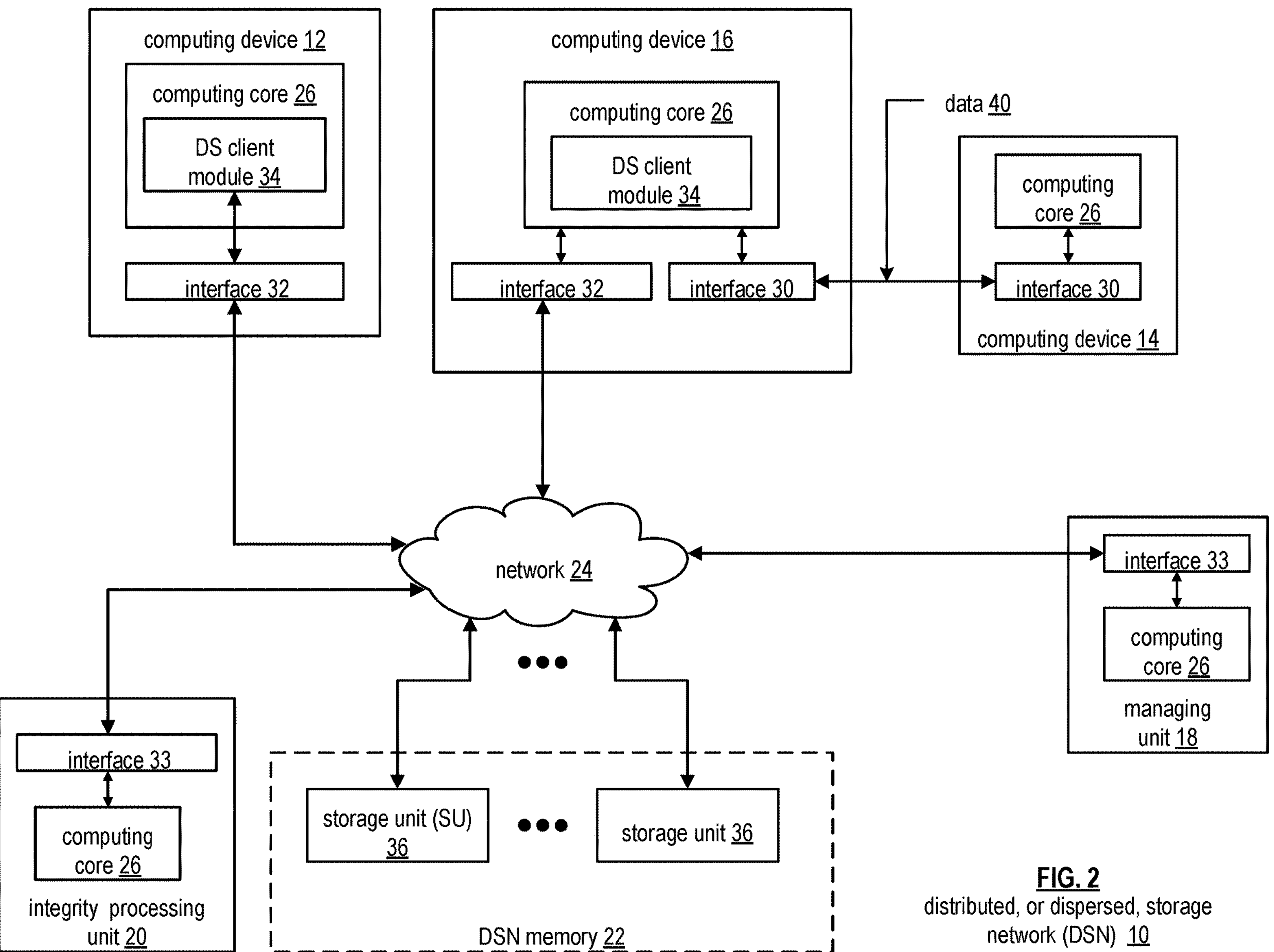
FIG. 2 is a schematic block diagram of an embodiment of a dispersed or distributed storage network (DSN) in accordance with the present invention.

FIG. 2 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

In at least one embodiment, storage endpoint 43 (FIG. 1) can be implemented in DSN memory 22. The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In at least one embodiment, source endpoint 13 can be implemented in one or more of the computing devices 12-16. Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance, such as providing information regarding network and/or link performance to source endpoint 13 (FIG. 1). Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

Figure 3:
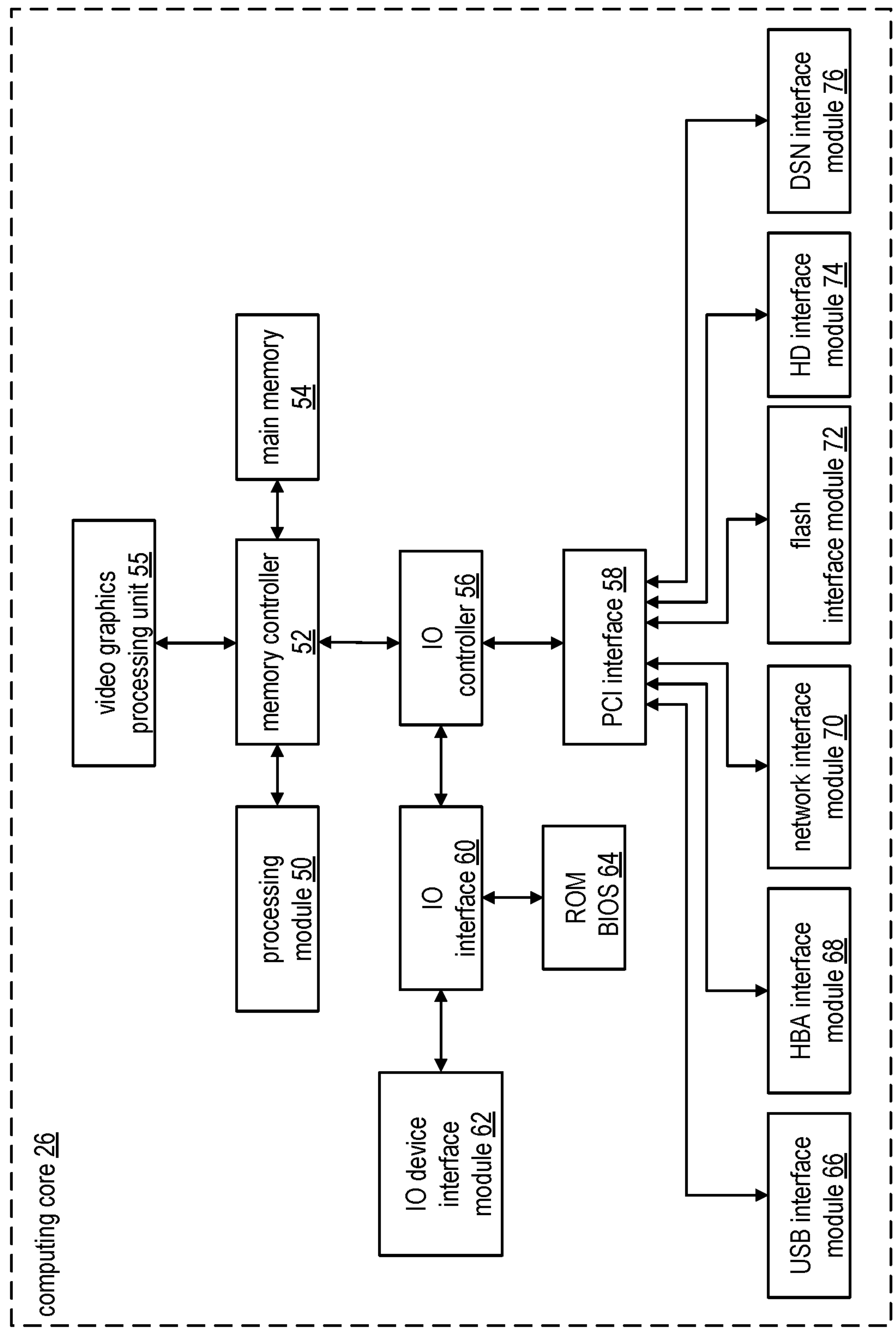
FIG. 3 is a schematic block diagram of an embodiment of a computing core in accordance with the present invention.

FIG. 3 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 2. Note that the IO device interface module 62 and/or the memory interface modules 66-76 may be collectively or individually referred to as IO ports.

FIG. 4 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 5 and a specific example is shown in FIG. 7); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 6 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 4, the computing device also creates a slice name (SN) for each encoded data slice (EDS) in the set of encoded data slices. A typical format for a slice name 80 is shown in FIG. 7. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 8, 9:
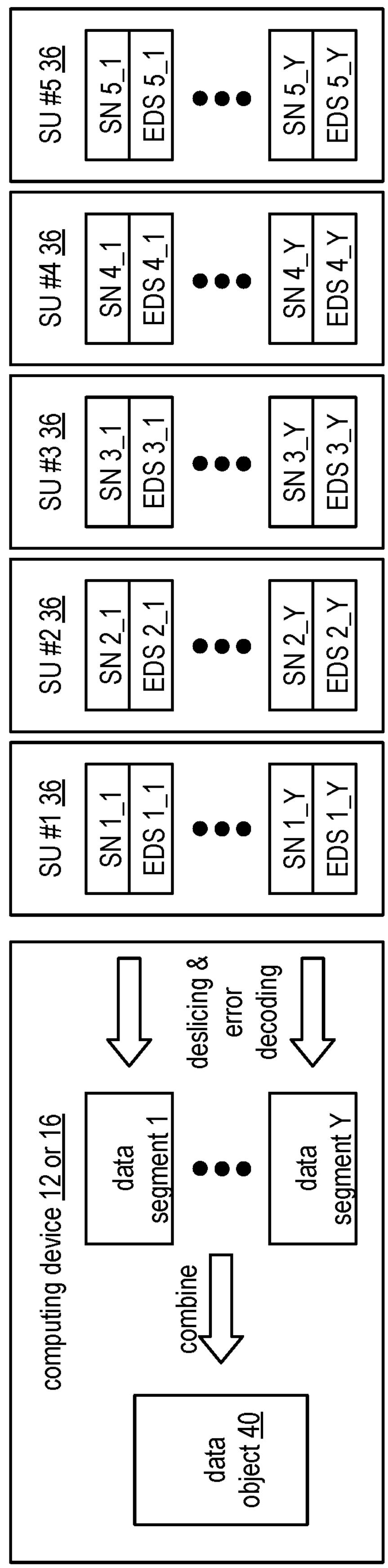
FIG. 8 is a schematic block diagram of an example of dispersed storage error decoding of data in accordance with the present invention.
FIG. 9 is a schematic block diagram of a generic example of an error decoding function in accordance with the present invention.

FIG. 8 is a schematic block diagram of an example of dispersed storage error decoding of a data object that was dispersed storage error encoded and stored in the example of FIG. 5. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 9. As shown, the decoding function is essentially an inverse of the encoding function of FIG. 5. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 10:
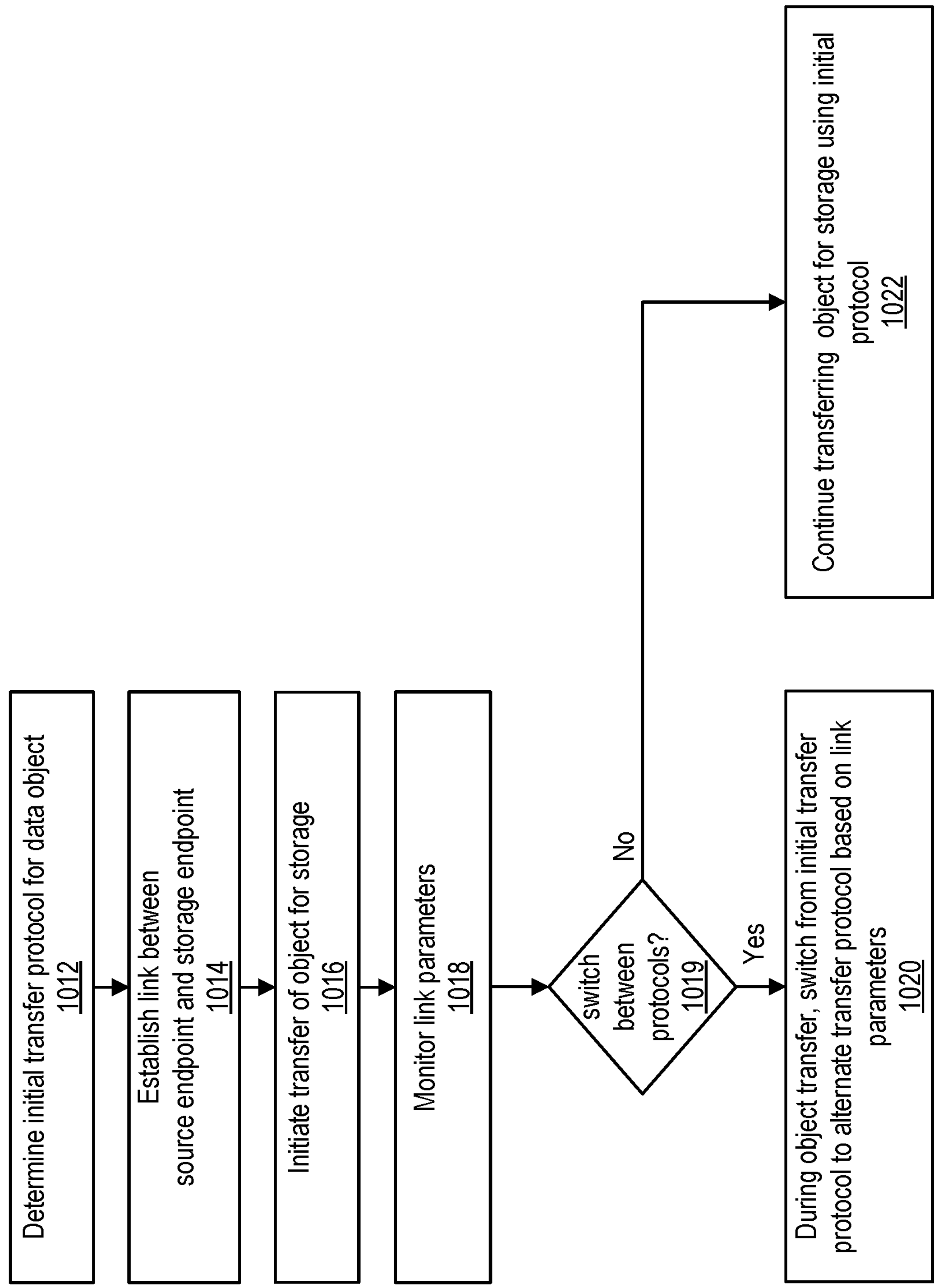
FIG. 10 is a logic diagram of an example of a method of transferring objects from a source endpoint to a storage endpoint in accordance with the present invention.

Referring next to FIG. 10, a logic diagram of an example of a method of transferring objects from a source endpoint to a storage endpoint will be discussed in accordance with various embodiments of the present invention. As illustrated by block 1012, a determination is made regarding which transfer service, or transfer technology protocol, to use at the beginning of a data object transfer between a source endpoint device and a storage endpoint device. The determination can be made based on current network/link conditions, such as current round trip times for requests and responses, historical network/link conditions, predefined parameter thresholds, pre-configured IP addresses of endpoints for object storage for requests, pre-configured bucket names for read or write requests, pre-configured object names for read or write requests, pre-configured accounts or users for requests, pre-configured file types, pre-configured file sizes, and information included in responses received from a storage endpoint, or on information about network conditions from other network devices capable of communicating with the source endpoint device, such as a managing unit.

In some embodiments, the storage endpoint can set its own transfer technology protocol based on information included in a message from the source endpoint, based on an evaluation of data received from the storage endpoint to identify the transfer technology protocol being used, or based on information about network conditions from other network devices capable of communicating with the source endpoint device, such as a managing unit.

In some embodiments, the storage endpoint device provides sufficient information to the source endpoint device to allow the source endpoint device to select an appropriate transfer technology protocol/transfer service the storage endpoint device can determine which information to provide to the source endpoint based on availability of a particular transfer service, or expected outages/disruptions in network or storage service, pre-configured bucket names, pre-configured IP addresses of end points for client applications, pre-configured object names, pre-configured users, pre-configured file types, pre-configured file sizes, information obtained from a management unit, or the like.

As illustrated by block 1014, a communications link is established between the source endpoint and the storage endpoint. The communications link can be established using various network messaging protocols, or as specified by one or more transfer technology protocols.

As illustrated by block 1016, transfer of an object from the source endpoint to the storage endpoint, for storage by the storage endpoint, is initiated. In at least one embodiment, the source endpoint initiates the object storage over the communications link using a transfer technology protocol selected according to one or more current link performance parameters, or as otherwise selected as discussed with reference to block 1012.

The current link performance parameters are monitored at block 1018. In at least one embodiment, monitoring of the link performance parameters is performed by the source endpoint. Monitoring the link performance parameters can include directly measuring link parameters such packet loss and round trip times of data packets including the object being transferred, but can also include indirect measurement of those same or other parameters. Indirect measurement can include receiving messages from external devices indicating packet loss statistics, round trip times of data or control messages, general network notifications and information indicating potential network device outages, or the like.

As illustrated by block 1019, a determination is made regarding whether the initial transfer technology protocol should be switched in favor of a different transfer technology protocol. The determination can be made based on, for example, measured packet loss or round trip time exceeding a preset threshold, based on historical network performance, or the like. For example, if network performance historically drops after 30 seconds of data transfer, or at particular times of day, the transfer service can be preemptively switched to avoid potential delays in transferring data objects. Similarly, transfer services can be switched in anticipation of a planned outage of particular portions of a communications network. Accordingly, in embodiments, the decision to switch from the initial (first) transfer technology protocol to the different (second) transfer technology protocol is performed in a manner transparent to a user of the source endpoint.

As illustrated by block 1020, if the determination at block 1019 indicates that the transfer technology protocol is to be switched, the protocol being used can be switched—even during transfer of an object, or in the midst of transferring a set of objects. If, however, the determination at block 1019 indicates that the protocol is not to be switched, transfer of the data object can be continued at block 1022.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method for use in a data storage network, the method comprising:

initiating a data storage transfer over a communications link between a source endpoint and a storage endpoint, the data storage transfer initiating a transmission of at least a portion of one data object from the source endpoint to the storage endpoint using a first transfer technology protocol of a plurality of transfer technology protocols supported by the storage endpoint;

monitoring at least one network performance parameter associated with the communication link between the source endpoint and the storage endpoint during the transmission of the at least a portion of the one data object; and during the transmission of the at least a portion of the one data object, automatically switching from the first transfer technology protocol to a second transfer technology protocol based on a result of the monitoring and one or more predetermined thresholds associated with the at least one network performance parameter, wherein the at least a portion of the one data object comprises multiple portions of the one data object, and wherein the automatically switching from the first transfer technology protocol to the second transfer technology protocol during the transmission of the multiple portions of the one data object, occurs between the transmission of the multiple portions of the one data object.

2. The computer-implemented method of claim 1, further comprising: configuring a software data kit (SDK) to use at least one of the group consisting of: pre-configured IP addresses of endpoints for object storage, pre-configured bucket names for read or write requests, pre-configured object names for read or write requests, pre-configured accounts or users for requests, and pre-configured file sizes.

3. The computer-implemented method of claim 1, further comprising: using a software data kit SDK running on the source endpoint to monitor the at least one network performance parameter.

4. The computer-implemented method of claim 1, wherein: the at least one network performance parameter includes at least one of the group consisting of: packet loss, and round trip time.

5. The computer-implemented method of claim 1, further comprising: deciding, in a manner transparent to a user at the source endpoint, to switch from the first transfer technology protocol to the second transfer technology protocol.

6. A source endpoint device comprising:

a processor;

memory coupled to the processor;

a program of instructions stored in the memory and executed by the processor, the program of instructions including:

at least one instruction to perform a data storage transfer over a communications link between a source endpoint and a storage endpoint, the data storage transfer transmitting at least a portion of one data object from the source endpoint device to the storage endpoint using a first transfer technology protocol of a plurality of transfer technology protocols supported by the storage endpoint;

at least one instruction to monitor at least one network performance parameter associated with real-time network conditions during the transmission of the at least a portion of the one data object; and at least one instruction to automatically switch, based on the monitoring and one or more predetermined thresholds associated with the at least one network performance parameter, from the first transfer technology protocol to a second transfer technology protocol during the transmission of the at least a portion of the one data object, wherein the at least a portion of the one data object comprises multiple portions of the one data object, and wherein the at least one instruction to automatically switch from the first transfer technology protocol to the second transfer technology protocol during the transmission of the multiple portions of the one data object, occurs between the transmission of the multiple portions of the one data object.

7. The source endpoint device of claim 6, further comprising:

a software data kit (SDK) configured to use at least one selected from the group consisting of: pre-configured IP addresses of endpoints for object storage, pre-configured bucket names for read or write requests, pre-configured object names for read or write requests, pre-configured accounts or users for requests, and pre-configured file sizes.

8. The source endpoint device of claim 6, further comprising: at least one instruction to use a software data kit (SDK) to monitor the at least one network performance parameter.

9. The source endpoint device of claim 6, wherein: the at least one network performance parameter includes at least one selected from the group consisting of: packet loss, and round trip time.

10. The source endpoint device of claim 6, the program of instructions further including: at least one instruction to decide, in a manner transparent to a user at the source endpoint device, to switch from the first transfer technology protocol to the second transfer technology protocol.

11. A non-transitory computer readable medium tangibly embodying a program of instructions configured to be stored in a memory and executed by a processor, the program of instructions including:

at least one instruction to perform a data storage transfer over a communications link between a source endpoint and a storage endpoint, the data storage transfer transmitting at least a portion of one data object from the source endpoint to the storage endpoint using a first transfer technology protocol of a plurality of transfer technology protocols supported by the storage endpoint;

at least one instruction to monitor at least one network performance parameter associated with the communication link between the source endpoint and the storage endpoint during the transmission of the at least a portion of the one data object; and at least one instruction to automatically switch, based on the monitoring and one or more predetermined thresholds associated with the at least one network performance parameter, from the first transfer technology protocol to a second transfer technology protocol during the transmission of the at least a portion of the one data object, wherein the at least a portion of the one data object is comprises multiple portions of the one data object, and wherein the at least one instruction to automatically switch from the first transfer technology protocol to the second transfer technology protocol during the transmission of the multiple portions of the one data object, occurs between the transmission of the multiple portions of the one data object.

12. The non-transitory computer readable medium of claim 11, further comprising: at least one instruction to use a software data kit (SDK) to monitor the at least one network performance parameter, wherein the at least one network performance parameter includes at least one selected from the group consisting of: packet loss, and round trip time.

13. The non-transitory computer readable medium of claim 11, the program of instructions further including: at least one instruction to decide, in a manner transparent to a user at the source endpoint, to switch from the first transfer technology protocol to the second transfer technology protocol.

14. The non-transitory computer readable medium of claim 11, the program of instructions including at least one instruction to automatically preemptively switch from the first transfer technology protocol to the second transfer technology protocol based on a planned outage of particular portions of a communications network to avoid potential delays in transmission of the one data object.

* * * * *